(12) United States Patent
Yu (10) Patent No.: US 8,016,253 B1
(45) Date of Patent: Sep. 13, 2011

(54) STEPLESS ADJUSTABLE MUSICAL INSTRUMENT STAND

(76) Inventor: Tsung-Yao Yu, Daya Township, Taichung County (TW)

( * ) Notice: Subject to any disclaimer, the term of this patent is extended or adjusted under 35 U.S.C. 154(b) by 2 days.

(21) Appl. No.: 12/773,160

(22) Filed: May 4, 2010

(51) Int. Cl.
*F16M 11/00* (2006.01)
(52) U.S. Cl. ........................................ 248/161
(58) Field of Classification Search ............... 248/125.8, 248/161, 157, 162.1, 412, 414
See application file for complete search history.

(56) References Cited

U.S. PATENT DOCUMENTS

4,706,916 A * 11/1987 Cullmann et al. ............ 248/168
2009/0245927 A1 * 10/2009 Stahle et al. ............... 403/109.5
* cited by examiner

*Primary Examiner* — Ramon Ramirez
(74) *Attorney, Agent, or Firm* — Alan Kamrath; Kamrath & Associates PA (57) ABSTRACT

A musical instrument stand includes a telescopic unit, a braking unit and an operation unit. The telescopic unit includes an outer tube and an inner tube. The braking unit includes a mounting sleeve, a plurality of locking pieces, a pressing block and an elastic member. The operation unit includes a connecting bar, a driven block and an operation handle. Thus, the inner tube is movable successively relative to the outer tube by pressing the operation handle and is locked onto the outer tube immediately by releasing the operation handle to adjust the distance between the inner tube and the outer tube so as to adjust the height of the telescopic unit freely so that the height of the musical instrument stand is adjustable in a stepless manner.

13 Claims, 9 Drawing Sheets

STEPLESS ADJUSTABLE MUSICAL INSTRUMENT STAND

BACKGROUND OF THE INVENTION

1. Field of the Invention

The present invention relates to a stand and, more particularly, to a musical instrument stand for supporting a musical instrument.

2. Description of the Related Art

A conventional musical instrument stand comprises a base unit and a telescopic unit mounted on the base unit. The telescopic unit includes an outer tube mounted on the base unit and an inner tube retractably mounted on the outer tube. Thus, the inner tube is movable relative to the outer tube to change the distance between the inner tube and the outer tube so as to adjust the height of the telescopic unit and to adjust the height of the musical instrument stand. However, the inner tube is movable relative to the outer tube step by step so that the height of the telescopic unit cannot be adjusted in a stepless manner. Thus, the height of the musical instrument stand cannot be adjusted freely to satisfy the user's requirement.

BRIEF SUMMARY OF THE INVENTION

In accordance with the present invention, there is provided a musical instrument stand, comprising a telescopic unit, a braking unit mounted on the telescopic unit, and an operation unit mounted on the telescopic unit and connected with the braking unit to control operation of the braking unit.

The telescopic unit includes an outer tube and an inner tube retractably mounted on the outer tube. The braking unit includes a mounting sleeve movably mounted in the outer tube of the telescopic unit and connected with a bottom of the inner tube of the telescopic unit to move in concert with the inner tube of the telescopic unit, a plurality of locking pieces each movably mounted on the mounting sleeve and each having an inner side formed with a pressing face and an outer side formed with a friction face that is movable to press the outer tube of the telescopic unit, a pressing block movably mounted in the mounting sleeve and movable to press the pressing face of each of the locking pieces to push each of the locking pieces toward the outer tube of the telescopic unit, and an elastic member mounted in the mounting sleeve and biased between the mounting sleeve and the pressing block to pull the pressing block toward the locking pieces. The operation unit includes a connecting bar movably mounted in the inner tube of the telescopic unit and having a lower end connected with the pressing block of the braking unit to move the pressing block of the braking unit outward relative to the locking pieces, a driven block movably mounted in the inner tube of the telescopic unit and secured on an upper end of the connecting bar to move the connecting bar relative to the inner tube of the telescopic unit, and an operation handle extending into the inner tube of the telescopic unit and abutting the driven block to move the driven block relative to the inner tube of the telescopic unit.

The primary objective of the present invention is to provide a stepless adjustable musical instrument stand whose height is adjustable in a stepless manner.

According to the primary objective of the present invention, the inner tube is movable successively relative to the outer tube by pressing the operation handle and is locked onto the outer tube immediately by releasing the operation handle to adjust the distance between the inner tube and the outer tube so as to adjust the height of the telescopic unit freely so that the height of the musical instrument stand is adjustable in a stepless manner.

According to another objective of the present invention, a user only needs to press the operation handle to unlock the inner tube from the outer tube and to release the operation handle to lock the inner tube onto the outer tube so as to adjust the height of the telescopic unit easily and quickly.

Further benefits and advantages of the present invention will become apparent after a careful reading of the detailed description with appropriate reference to the accompanying drawings.

DETAILED DESCRIPTION OF THE INVENTION

Figure 1:
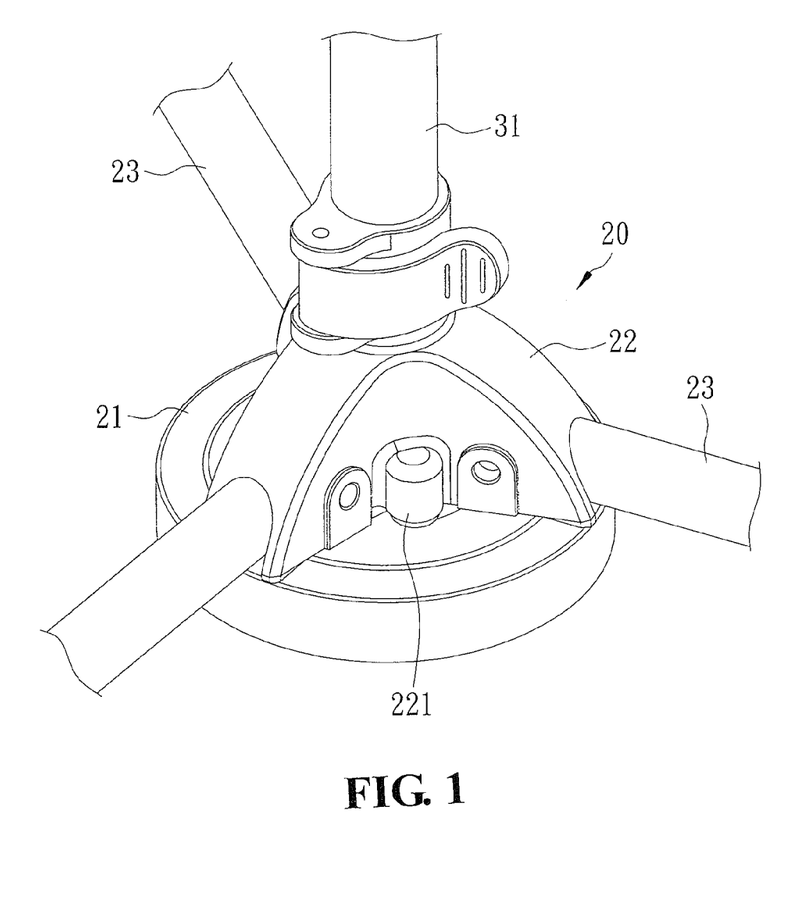
FIG. 1 is an exploded perspective view of a musical instrument stand in accordance with the preferred embodiment of the present invention.
Figure 2:
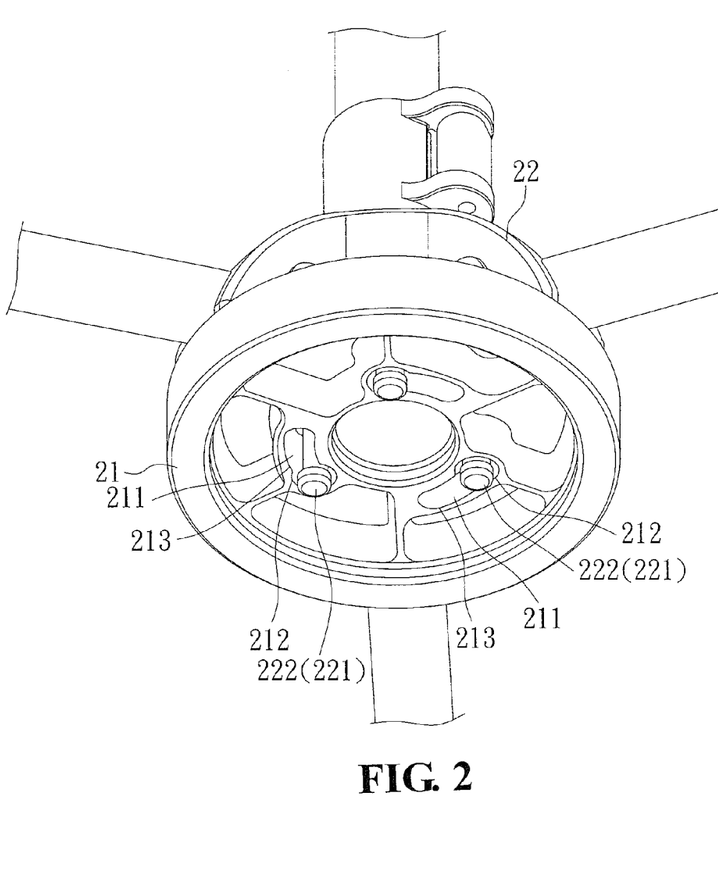
FIG. 2 is a side cross-sectional assembly view of the musical instrument stand as shown in FIG. 1.

Referring to the drawings and initially to FIGS. 1 and 2, a musical instrument stand in accordance with the preferred embodiment of the present invention comprises a telescopic unit 30, a braking unit 50 mounted on the telescopic unit 30, and an operation unit 40 mounted on the telescopic unit 30 and connected with the braking unit 50 to control operation of the braking unit 50.

The telescopic unit 30 includes an outer tube 31, an inner tube 32 retractably mounted on the outer tube 31 and a stop ring 33 secured on a top of the outer tube 31 and surrounding the inner tube 32. The inner tube 32 of the telescopic unit 30 has an upper end formed with an opening 321. The stop ring 33 of the telescopic unit 30 has a bottom formed with a reduced stop flange 331 inserted into the outer tube 31 and disposed between the outer tube 31 and the inner tube 32.

The braking unit 50 includes a mounting sleeve 51 movably mounted in the outer tube 31 of the telescopic unit 30 and connected with a bottom of the inner tube 32 of the telescopic unit 30 to move in concert with the inner tube 32 of the telescopic unit 30, a plurality of locking pieces 52 each movably mounted on the mounting sleeve 51 and each having an inner side formed with a pressing face 521 and an outer side formed with a friction face 522 that is movable to press the outer tube 31 of the telescopic unit 30, a pressing block 43 movably mounted in the mounting sleeve 51 and movable to press the pressing face 521 of each of the locking pieces 52 to push each of the locking pieces 52 toward the outer tube 31 of the telescopic unit 30, and an elastic member 53 mounted in the mounting sleeve 51 and biased between the mounting sleeve 51 and the pressing block 43 to pull the pressing block 43 toward the locking pieces 52.

The mounting sleeve 51 of the braking unit 50 has an upper end formed with a plug 512 inserted into the bottom of the inner tube 32 of the telescopic unit 30 and a lower end formed with a guide portion 513 movable in the outer tube 31 of the telescopic unit 30. The guide portion 513 of the mounting sleeve 51 has a size greater than that of the plug 512 to form a stop shoulder 514 between the plug 512 and the guide portion 513 of the mounting sleeve 51. The stop shoulder 514 of the mounting sleeve 51 abuts the bottom of the inner tube 32 of the telescopic unit 30 and is movable to abut the stop flange 331 of the stop ring 33 to stop movement of the mounting sleeve 51.

The mounting sleeve 51 of the braking unit 50 has an inner wall formed with an axial hole 511 to receive the pressing block 43 and the elastic member 53. The mounting sleeve 51 of the braking unit 50 has a peripheral wall formed with a plurality of receiving slots 515 each connected to the axial hole 511 to receive the locking pieces 52. The receiving slots 515 of the mounting sleeve 51 is formed in a peripheral wall of the guide portion 513.

The locking pieces 52 of the braking unit 50 are movably mounted in the receiving slots 515 of the mounting sleeve 51 respectively. Each of the locking pieces 52 of the braking unit 50 has a top face 524 and a bottom face 525. The pressing face 521 of each of the locking pieces 52 is extended into the axial hole 511 of the mounting sleeve 51. The pressing face 521 of each of the locking pieces 52 is a ramp, and each of the locking pieces 52 of the braking unit 50 has a thickness increased gradually from the top face 524 to the bottom face 525 of each of the locking pieces 52. The friction face 522 of each of the locking pieces 52 is formed with a plurality of damping grooves 523 each abutting the outer tube 31 of the telescopic unit 30. Each of the damping grooves 523 of each of the locking pieces 52 is perpendicular to the pressing block 43.

The pressing block 43 of the braking unit 50 is movable in the axial hole 511 of the mounting sleeve 51 and has an upper end formed with a first connecting portion 431 and a lower end formed with a second connecting portion 432. The pressing block 43 of the braking unit 50 has a peripheral wall formed with a tapered pressing portion 433 slidably pressing the pressing face 521 of each of the locking pieces 52. The pressing portion 433 of the pressing block 43 has a diameter decreased gradually from the upper end to the lower end of the pressing block 43.

The braking unit 50 further includes a fixing pin 54 extending through the guide portion 513 of the mounting sleeve 51, and the elastic member 53 of the braking unit 50 has an upper end connected with the second connecting portion 432 of the pressing block 43 and a lower end connected with the fixing pin 54.

The operation unit 40 includes a connecting bar 41 movably mounted in the inner tube 32 of the telescopic unit 30 and having a lower end connected with the pressing block 43 of the braking unit 50 to move the pressing block 43 of the braking unit 50 outward relative to the locking pieces 52, a driven block 42 movably mounted in the inner tube 32 of the telescopic unit 30 and secured on an upper end of the connecting bar 41 to move the connecting bar 41 relative to the inner tube 32 of the telescopic unit 30, an operation handle 44 extending into the inner tube 32 of the telescopic unit 30 and abutting the driven block 42 to move the driven block 42 relative to the inner tube 32 of the telescopic unit 30, a housing 45 mounted on the inner tube 32 of the telescopic unit 30 and connected with the operation handle 44 to pivotally support the operation handle 44, a top cap 46 secured on a top of the inner tube 32 of the telescopic unit 30, and an elastic element 47 mounted in the inner tube 32 of the telescopic unit 30 and biased between the top cap 46 and the driven block 42 to push the driven block 42 toward the operation handle 44.

The connecting bar 41 of the operation unit 40 is made of steel. The lower end of the connecting bar 41 of the operation unit 40 is connected with the first connecting portion 431 of the pressing block 43. The driven block 42 of the operation unit 40 is disposed above the opening 321 of the inner tube 32 and the operation handle 44. The top cap 46 of the operation unit 40 is disposed above the driven block 42.

The operation handle 44 of the operation unit 40 is pivotally mounted on the housing 45. The operation handle 44 of the operation unit 40 has a substantially inverted L-shaped profile. The operation handle 44 of the operation unit 40 has a first end formed with a drive portion 442 extending through the opening 321 of the inner tube 32 into the inner tube 32 of the telescopic unit 30 and abutting a bottom of the driven block 42. The drive portion 442 of the operation handle 44 has an end face formed with a receiving slot 443 to receive the connecting bar 41. The operation handle 44 of the operation unit 40 has a second end formed with a push portion 441 protruding outwardly from the housing 45.

Figure 3:
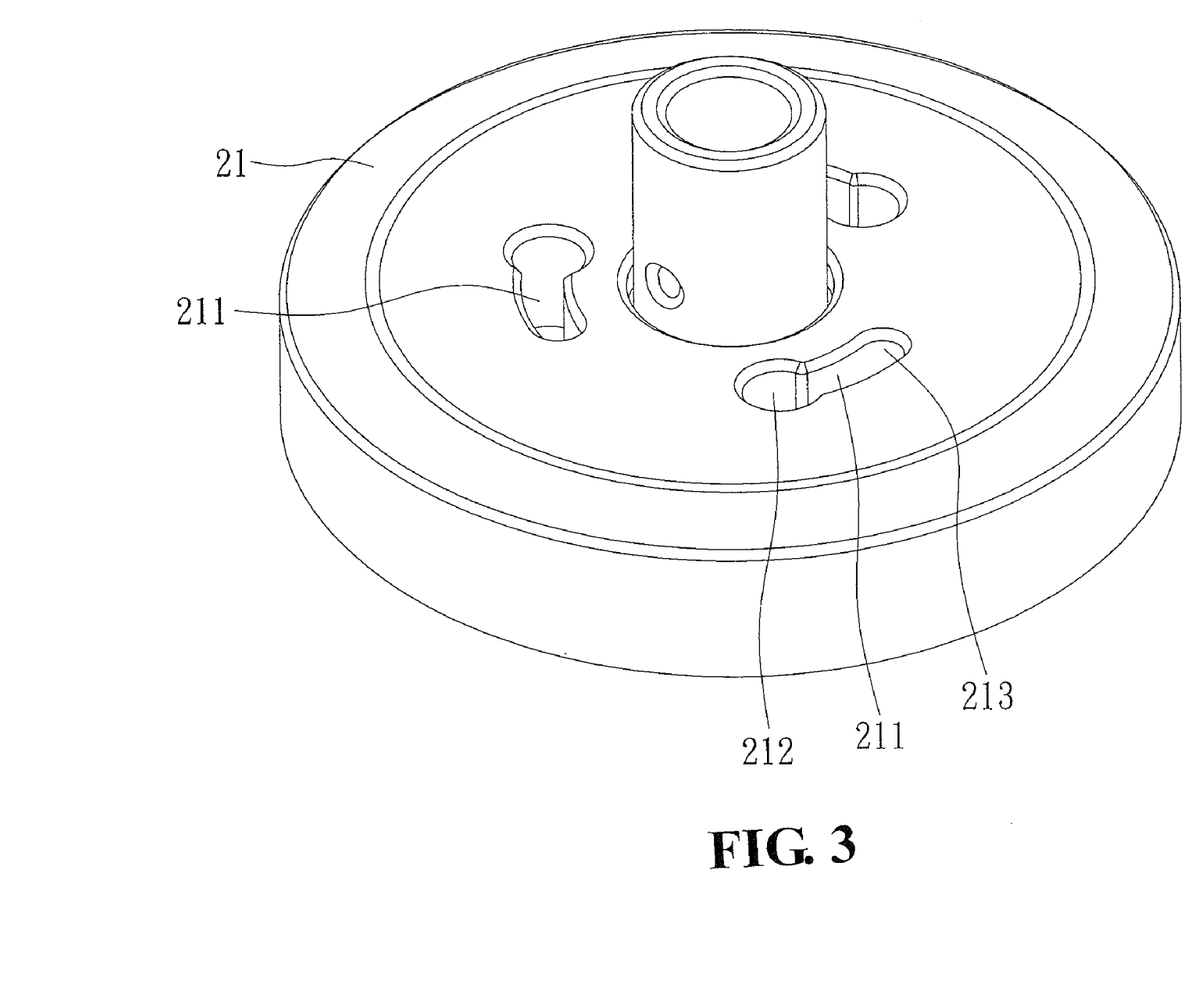
FIG. 3 is a schematic operational view of the musical instrument stand as shown in FIG. 2.
Figure 4:
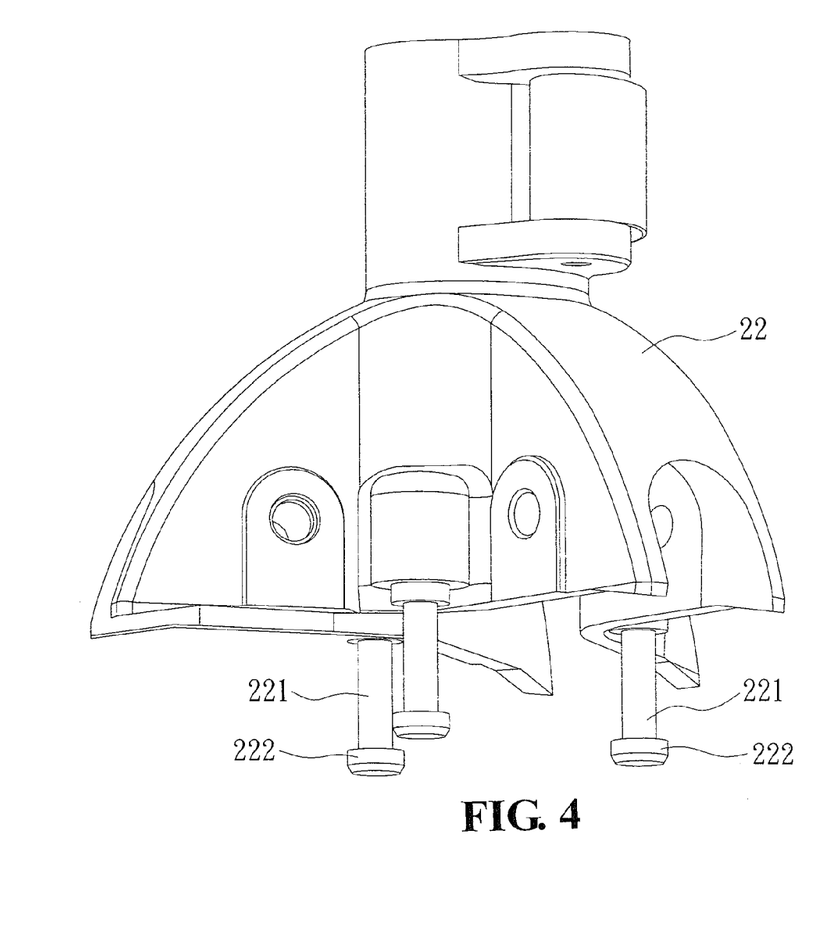
FIG. 4 is a locally enlarged view of the musical instrument stand as shown in FIG. 3.

In operation, referring to FIGS. 2-4 with reference to FIG. 1, the elastic member 53 is biased between the mounting sleeve 51 and the pressing block 43 to pull the pressing block 43 toward the locking pieces 52 so that the pressing portion 433 of the pressing block 43 presses the pressing face 521 of each of the locking pieces 52 to push each of the locking pieces 52 toward the outer tube 31 as shown in FIG. 2. In such a manner, the friction face 522 of each of the locking pieces 52 is moved to press the outer tube 31 to lock each of the locking pieces 52 by the outer tube 31 so that the mounting sleeve 51 is locked in the outer tube 31 to lock the inner tube 32 onto the outer tube 31. Thus, the inner tube 32 is locked onto the outer tube 31 and cannot be moved relative to the outer tube 31.

When the push portion 441 of the operation handle 44 is pushed toward the inner tube 32, the operation handle 44 is pivoted on the housing 45, and the drive portion 442 of the operation handle 44 is moved upward to push the driven block 42 which lifts the connecting bar 41 which lifts the pressing block 43 which is moved upward to space from the locking pieces 52 as shown in FIGS. 3 and 4 so that the pressing portion 433 of the pressing block 43 is detached from the pressing face 521 of each of the locking pieces 52 to release each of the locking pieces 52 from the outer tube 31. In such a manner, the friction face 522 of each of the locking pieces 52 is detached from the outer tube 31 to unlock each of the locking pieces 52 from the outer tube 31 so that the mounting sleeve 51 is unlocked from the outer tube 31 to unlock the inner tube 32 from the outer tube 31. Thus, the inner tube 32 is unlocked from the outer tube 31 and is movable relative to the outer tube 31 to adjust the distance between the inner tube 32 and the outer tube 31 so as to adjust the height of the telescopic unit 30.

After the force applied on the operation handle 44 is removed, the driven block 42 is pushed downward by the restoring force of the elastic element 47 to lower the connecting bar 41 which is moved downward to push the pressing block 43 toward the locking pieces 52 as shown in FIG. 2 to lock the locking pieces 52 onto the outer tube 31 so that the inner tube 32 is locked onto the outer tube 31 again. At this time, the elastic member 53 provides a restoring force to the pressing block 43 to accelerate movement of the pressing block 43 toward the locking pieces 52.

Figure 5:
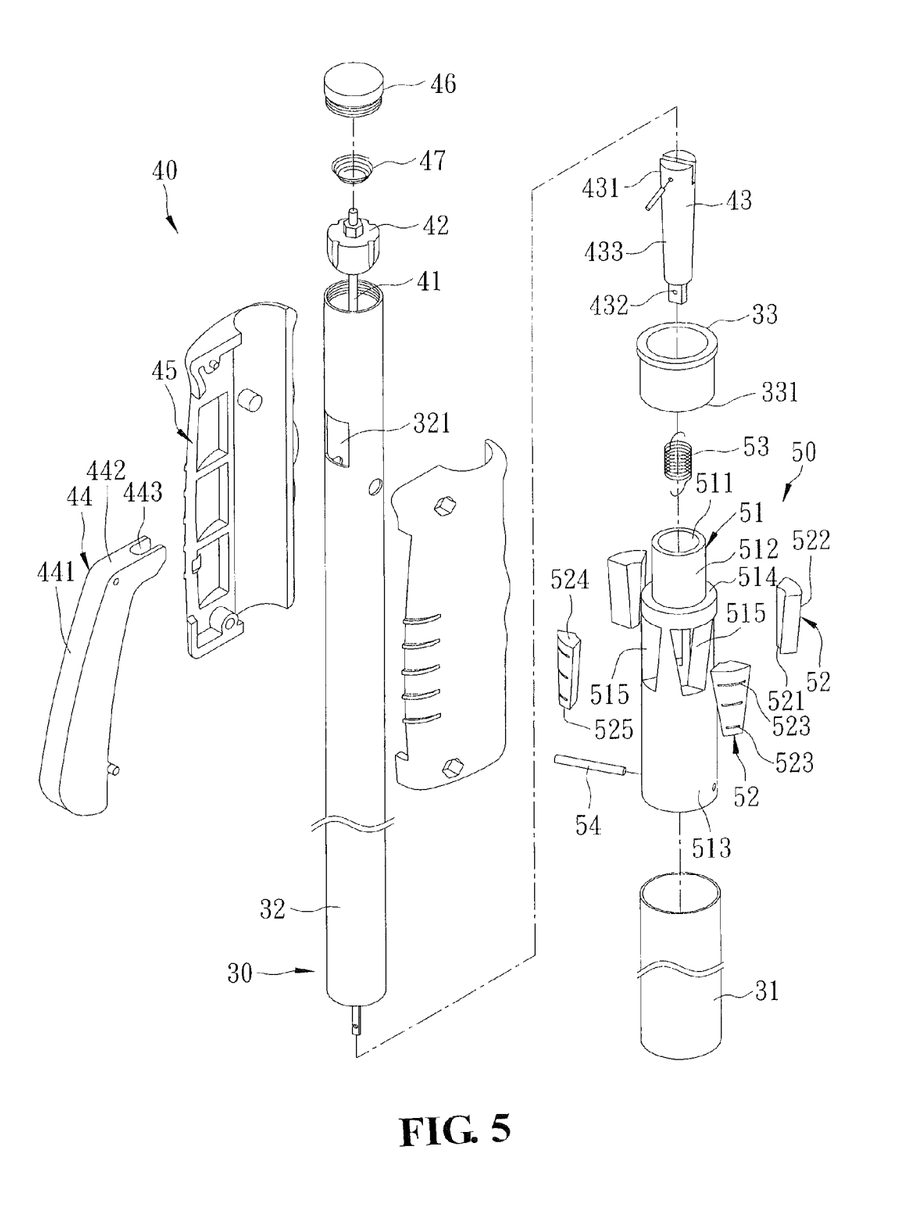
FIG. 5 is a partially side cross-sectional assembly view of the musical instrument stand in accordance with another preferred embodiment of the present invention.
Figure 6:
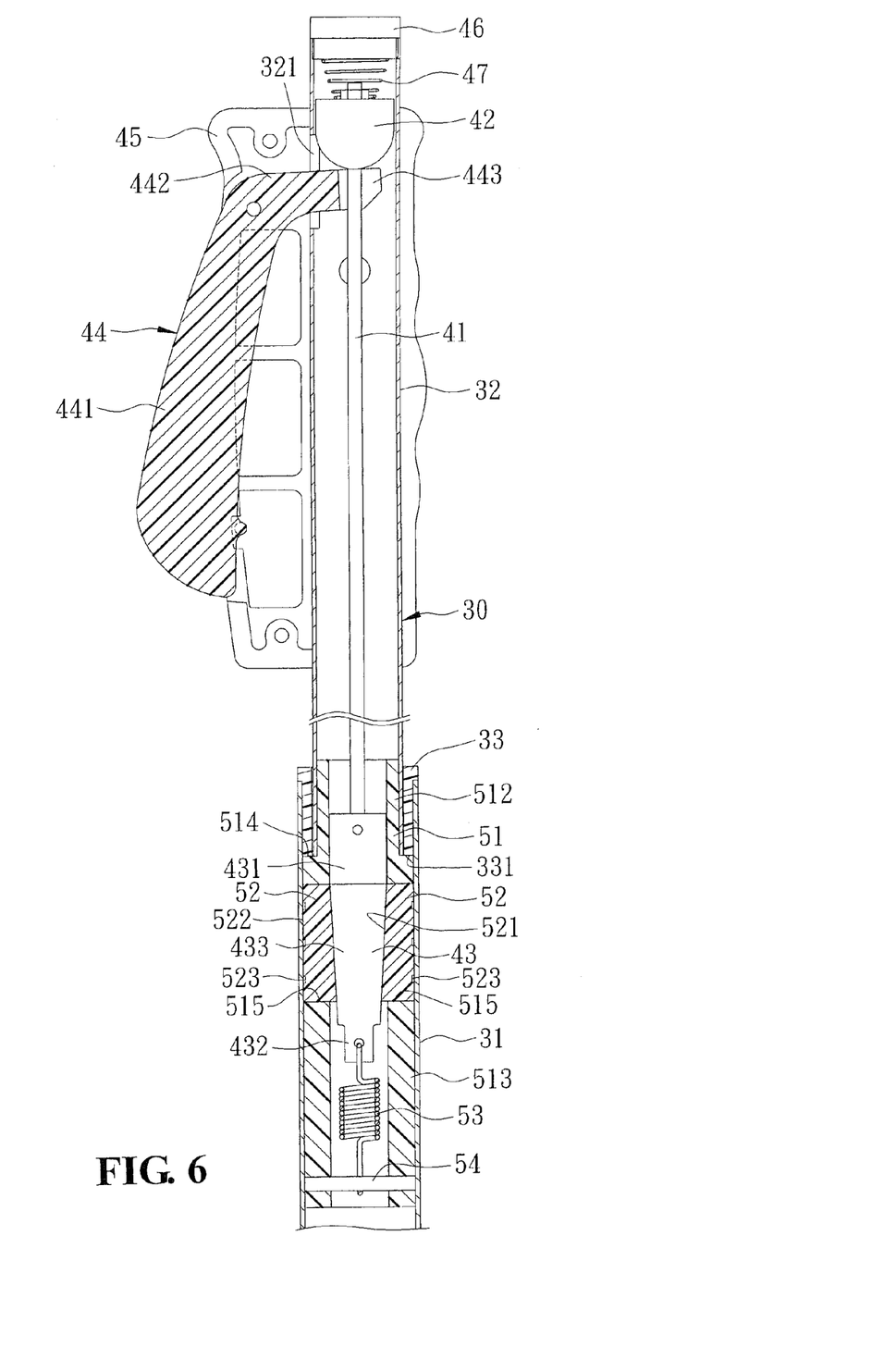
FIG. 6 is a partially perspective view of the musical instrument stand in accordance with the preferred embodiment of the present invention.

As shown in FIG. 5, each of the locking pieces 52 has an oblique bottom face 525, and the receiving slots 515 of the mounting sleeve 51 has an oblique bottom wall abutting the oblique bottom face of each of the locking pieces 52.

Accordingly, the inner tube 32 is movable successively relative to the outer tube 31 by pressing the operation handle 44 and is locked onto the outer tube 31 immediately by releasing the operation handle 44 to adjust the distance between the inner tube 32 and the outer tube 31 so as to adjust the height of the telescopic unit 30 freely so that the height of the musical instrument stand is adjustable in a stepless manner. In addition, a user only needs to press the operation handle 44 to unlock the inner tube 32 from the outer tube 31 and to release the operation handle 44 to lock the inner tube 32 onto the outer tube 31 so as to adjust the height of the telescopic unit 30 easily and quickly.

Referring to FIGS. 6-9 with reference to FIGS. 1-4, the musical instrument stand further comprises a base unit 20 mounted on the telescopic unit 30. The base unit 20 includes a limit disk 21 rotatably mounted on a lower end of the outer tube 31 of the telescopic unit 30, a support bracket 22 slidably mounted on the outer tube 31 of the telescopic unit 30 and located above the limit disk 21, and a plurality of support rods 23 each pivotally mounted on the support bracket 22 and each abutting a top of the limit disk 21. The support bracket 22 of the base unit 20 has a bottom provided with a plurality of fixing posts 221 each having a lower end formed with an enlarged locking head 222. The limit disk 21 of the base unit 20 has a peripheral wall provided with a plurality of elongate locking slots 211 each slidably mounted on a respective one of the fixing posts 221 of the support bracket 22 and each releasably locked by the locking head 222 of the respective fixing post 221. Each of the locking slots 211 of the limit disk 21 has a first end formed with a passage 212 which has a size greater than that of the respective fixing post 221 and greater than that of the locking head 222 of the respective fixing post 221. Each of the locking slots 211 of the limit disk 21 has a second end formed with a locking groove 213 which has a size equal to that of the respective fixing post 221 and smaller than that of the locking head 222 of the respective fixing post 221.

Figure 7:
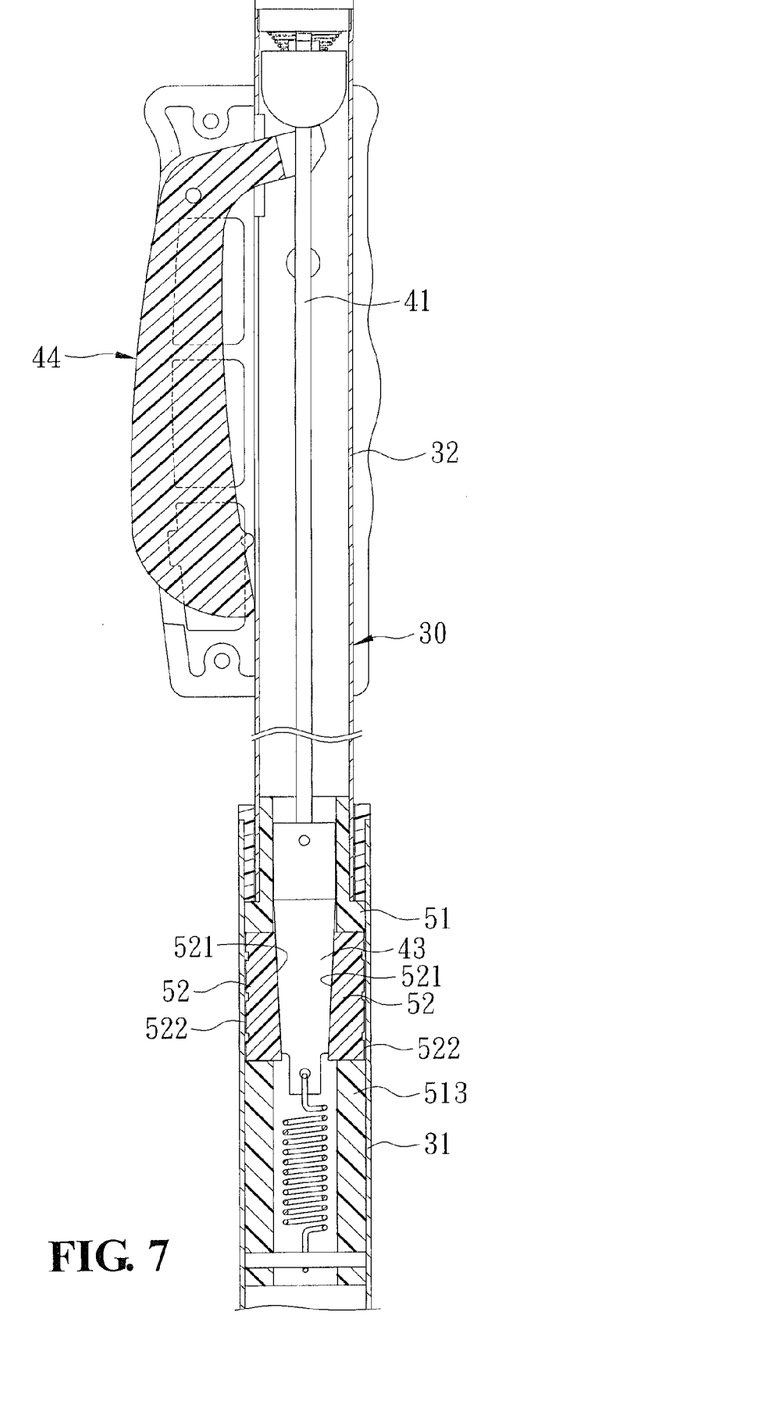
FIG. 7 is a perspective bottom operational view of the musical instrument stand as shown in FIG. 6.

In assembly, when the support bracket 22 is moved toward the limit disk 21, each of the fixing posts 221 is inserted into the passage 212 of the respective locking slot 211, and the locking head 222 of each of the fixing posts 221 protrudes outwardly from the passage 212 of the respective locking slot 211. Then, when the limit disk 21 is rotated relative to the support bracket 22, each of the fixing posts 221 is inserted into the locking groove 213 of the respective locking slot 211, and the locking head 222 of each of the fixing posts 221 is locked onto the locking groove 213 of the respective locking slot 211 so that the support bracket 22 is locked onto the limit disk 21 to stretch the support rods 23 as shown in FIG. 7.

Figure 8:
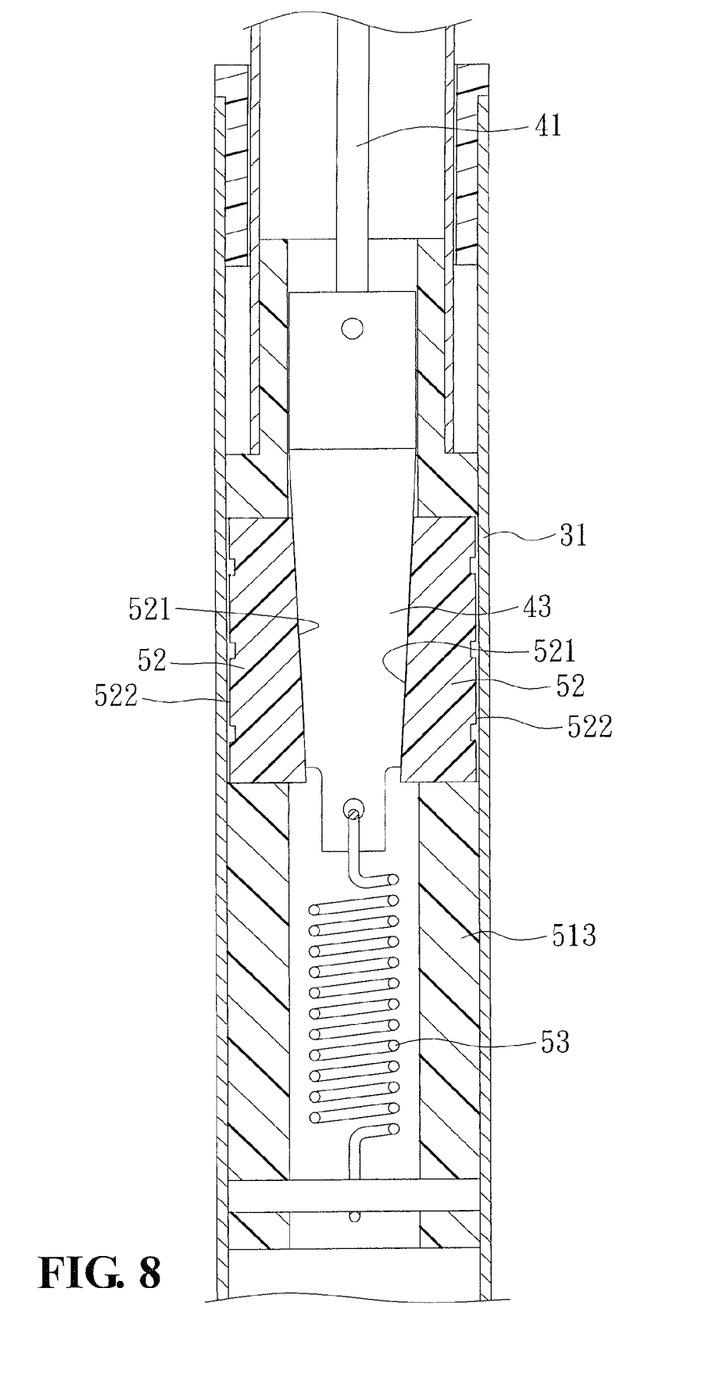
FIG. 8 is a perspective view of a limit disk of the musical instrument stand as shown in FIG. 6.
Figure 9:
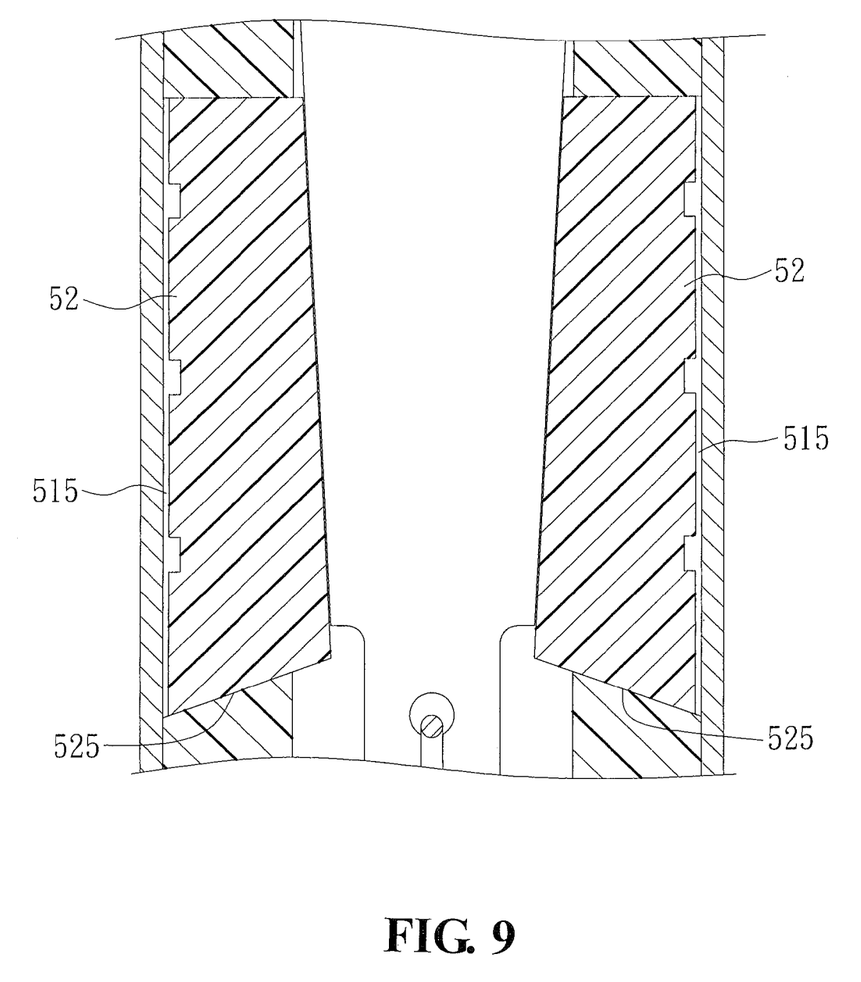
FIG. 9 is a perspective view of a support bracket of the musical instrument stand as shown in FIG. 6.

On the contrary, when the limit disk 21 is rotated relative to the support bracket 22 in the opposite direction, each of the fixing posts 221 is inserted into the passage 212 of the respective locking slot 211 as shown in FIG. 8, and the locking head 222 of each of the fixing posts 221 is allowed to pass through the passage 212 of the respective locking slot 211 to unlock the support bracket 22 from the limit disk 21, so that the support bracket 22 is movable upward relative to the limit disk 21 to fold the support rods 23.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A musical instrument stand, comprising:
a telescopic unit;
a braking unit mounted on the telescopic unit; and
an operation unit mounted on the telescopic unit and connected with the braking unit to control operation of the braking unit;
wherein the telescopic unit includes:
an outer tube;
an inner tube retractably mounted on the outer tube;
the braking unit includes:
a mounting sleeve movably mounted in the outer tube of the telescopic unit and connected with a bottom of the inner tube of the telescopic unit to move in concert with the inner tube of the telescopic unit;
a plurality of locking pieces each movably mounted on the mounting sleeve and each having an inner side formed with a pressing face and an outer side formed with a friction face that is movable to press the outer tube of the telescopic unit;
a pressing block movably mounted in the mounting sleeve and movable to press the pressing face of each of the locking pieces to push each of the locking pieces toward the outer tube of the telescopic unit;
an elastic member mounted in the mounting sleeve and biased between the mounting sleeve and the pressing block to pull the pressing block toward the locking pieces;
the operation unit includes:
a connecting bar movably mounted in the inner tube of the telescopic unit and having a lower end connected with the pressing block of the braking unit to move the pressing block of the braking unit outward relative to the locking pieces;
a driven block movably mounted in the inner tube of the telescopic unit and secured on an upper end of the connecting bar to move the connecting bar relative to the inner tube of the telescopic unit;
an operation handle extending into the inner tube of the telescopic unit and abutting the driven block to move the driven block relative to the inner tube of the telescopic unit.

2. The musical instrument stand of claim 1, wherein
the mounting sleeve of the braking unit has an upper end formed with a plug inserted into the bottom of the inner tube of the telescopic unit and a lower end formed with a guide portion movable in the outer tube of the telescopic unit;
the mounting sleeve of the braking unit has an inner wall formed with an axial hole to receive the pressing block and the elastic member;
the mounting sleeve of the braking unit has a peripheral wall formed with a plurality of receiving slots each connected to the axial hole to receive the locking pieces;
the receiving slots of the mounting sleeve is formed in a peripheral wall of the guide portion;
the locking pieces of the braking unit are movably mounted in the receiving slots of the mounting sleeve respectively;
the pressing block of the braking unit is movable in the axial hole of the mounting sleeve.

3. The musical instrument stand of claim 2, wherein
the telescopic unit further includes a stop ring secured on a top of the outer tube and surrounding the inner tube;

the stop ring of the telescopic unit has a bottom formed with a reduced stop flange inserted into the outer tube and disposed between the outer tube and the inner tube;

the guide portion of the mounting sleeve has a size greater than that of the plug to form a stop shoulder between the plug and the guide portion of the mounting sleeve;

the stop shoulder of the mounting sleeve abuts the bottom of the inner tube of the telescopic unit and is movable to abut the stop flange of the stop ring to stop movement of the mounting sleeve.

4. The musical instrument stand of claim 2, wherein the inner tube of the telescopic unit has an upper end formed with an opening;

the operation unit further includes:

a housing mounted on the inner tube of the telescopic unit and connected with the operation handle to pivotally support the operation handle;

the operation handle of the operation unit is pivotally mounted on the housing;

the operation handle of the operation unit has a first end formed with a drive portion extending through the opening of the inner tube into the inner tube of the telescopic unit and abutting a bottom of the driven block;

the operation handle of the operation unit has a second end formed with a push portion protruding outwardly from the housing;

the driven block of the operation unit is disposed above the opening of the inner tube and the operation handle.

5. The musical instrument stand of claim 4, wherein the drive portion of the operation handle has an end face formed with a receiving slot to receive the connecting bar.

6. The musical instrument stand of claim 2, wherein the pressing block of the braking unit has an upper end formed with a first connecting portion and a lower end formed with a second connecting portion;

the lower end of the connecting bar of the operation unit is connected with the first connecting portion of the pressing block;

the braking unit further includes a fixing pin extending through the guide portion of the mounting sleeve;

the elastic member of the braking unit has an upper end connected with the second connecting portion of the pressing block and a lower end connected with the fixing pin.

7. The musical instrument stand of claim 1, wherein the friction face of each of the locking pieces is formed with a plurality of damping grooves each abutting the outer tube of the telescopic unit.

8. The musical instrument stand of claim 7, wherein each of the damping grooves of each of the locking pieces is perpendicular to the pressing block.

9. The musical instrument stand of claim 1, wherein the pressing face of each of the locking pieces is a ramp;

the pressing block of the braking unit has a peripheral wall formed with a tapered pressing portion slidably pressing the pressing face of each of the locking pieces.

10. The musical instrument stand of claim 9, wherein each of the locking pieces of the braking unit has a top face and a bottom face;

each of the locking pieces of the braking unit has a thickness increased gradually from the top face to the bottom face of each of the locking pieces;

the pressing portion of the pressing block has a diameter decreased gradually from an upper end to a lower end of the pressing block.

11. The musical instrument stand of claim 1, wherein the operation unit further includes:

a top cap secured on a top of the inner tube of the telescopic unit;

an elastic element mounted in the inner tube of the telescopic unit and biased between the top cap and the driven block to push the driven block toward the operation handle;

the top cap of the operation unit is disposed above the driven block.

12. The musical instrument stand of claim 1, wherein the musical instrument stand further comprises a base unit mounted on the telescopic unit;

the base unit includes:

a limit disk rotatably mounted on a lower end of the outer tube of the telescopic unit;

a support bracket slidably mounted on the outer tube of the telescopic unit and located above the limit disk;

a plurality of support rods each pivotally mounted on the support bracket and each abutting a top of the limit disk.

13. The musical instrument stand of claim 12, wherein the support bracket of the base unit has a bottom provided with a plurality of fixing posts each having a lower end formed with an enlarged locking head;

the limit disk of the base unit has a peripheral wall provided with a plurality of elongate locking slots each slidably mounted on a respective one of the fixing posts of the support bracket and each releasably locked by the locking head of the respective fixing post;

each of the locking slots of the limit disk has a first end formed with a passage which has a size greater than that of the respective fixing post and greater than that of the locking head of the respective fixing post;

each of the locking slots of the limit disk has a second end formed with a locking groove which has a size equal to that of the respective fixing post and smaller than that of the locking head of the respective fixing post.

\* \* \* \* \*